Aug. 3, 1937. J. J. NOWAK 2,088,717
VAPORIZING APPARATUS
Filed Dec. 13, 1935
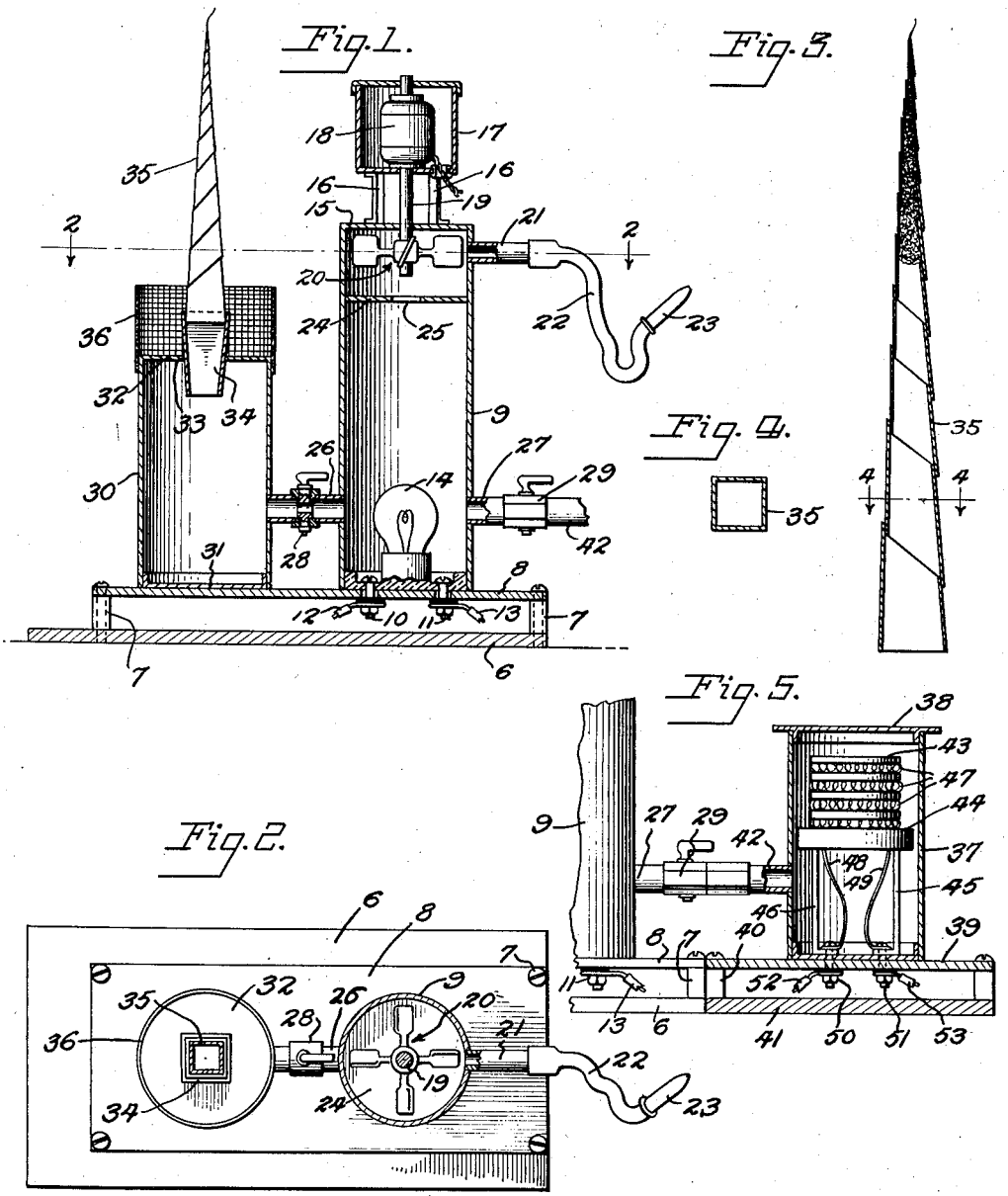
Inventor
J. J. Nowak Patented Aug. 3, 1937

2,088,717

UNITED STATES PATENT OFFICE 2,088,717

VAPORIZING APPARATUS

John J. Nowak, Buffalo, N. Y.

Application December 13, 1935, Serial No. 54,317

2 Claims. (Cl. 21—125)

This invention relates to vaporizers particularly adapted for impregnating air with any desired medicament or drug, or with any combination of medicaments or drugs, intended for use through inhalation, or for local application to the human body.

The main object of the invention is to provide a device of the character described which heats the vapors on their passage to a discharge tube or nipple; and, which may be connected to any desired number of vaporizing devices for the purpose of selectively discharging different medicated vapors in succession or in any desired combination.

Other objects of the invention will become apparent as the detailed description thereof proceeds.

In the drawing:

Figure 1 is a central vertical section of the vapor distributer as applied to a single vaporizing device;

Figure 2 is a top plan view of the apparatus shown in Figure 1;

Figure 3 is a central section through a medicated candle peculiarly adapted for use as a source of medicated vapor in this apparatus;

Figure 4 is a section taken on the line 4—4 of Figure 3; and

Figure 5 is a central vertical section of another form of vaporizer adapted to be connected to the vapor distributer illustrated in Figure 1.

As shown in Figure 1 of the drawing, the vapor distributer comprises a sub-base 6 provided with standards 7 supporting a base plate 8 parallel to and spaced apart from the sub-base to accommodate the wiring and various electric contact members which may be used for supplying electric current. A casing 9, supported on the base plate 8, is provided at its bottom with terminal screws 10 and 11 adapted to receive the wires 12 and 13 for conducting electrical energy to an electric lamp 14, suitably supported in a socket fixed to the bottom of the casing.

The upper part of the casing 9 is closed by a top 15 on which is mounted, by means of standards 16, a casing 17 enclosing an electric motor 18. The motor 18 has its rotor shaft 19 extending through the bottom of the casing 17 and through the top 15; and, immediately below the top 15 has secured thereto a fan 20 having the blades thereof shaped to suck air upwardly through the casing 9 and outwardly through a discharge outlet 21 extending laterally from the casing 9 at substantially the level of the fan 20.

The outlet 21 has a flexible tube 22 connected thereto; and this tube is provided at its outer end with a nipple 23 adapted for insertion in the human ear or other aperture in the human body intended to receive the discharged medicated vapors. Directly below the lower end of the rotor 19 and the fan 20 the casing 9 is provided with a baffle plate 24 having an aperture 25 through the center thereof. The baffle plate, with its central aperture, is an essential element of this apparatus, since it prevents downward movement of the medicated air after its passage through the aperture 25, and traps the air in such manner as to cause the fan blades to force the medicated air through the discharge outlet 21.

Near the lower end of the casing 9, the latter is provided with any desired number of inlet pipes, each of which is valve-controlled and is designed to receive any suitable connector extending from a source of medicated vapor. In Figure 1 of the drawing, only two of these valve controlled inlet pipes are shown. It is to be understood, however, that this is merely for the purpose of illustration and is not intended in any way to limit the invention for use with any particular number of sources of vapor supply.

As shown in Figure 1 of the drawing, inlet pipes 26 and 27 extend laterally from the casing 9. The pipe 26 is controlled by a valve 28; and, the pipe 27 is controlled by a valve 29. The pipe 26 is shown as detachably connected to a casing 30 having a closed bottom 31. The top 32 of the casing 30 is provided with a central aperture 33 through which extends a funnel shaped inlet tube 34. This inlet tube 34 is square in cross section, as shown in Figure 2 of the drawing, to receive and support a correspondingly shaped medicated candle 35. A cylindrical screen 36, detachably connected to the upper end of the casing 30, extends around and above the top of the tube 34 to trap embers resulting from the combustion of the medicated candle.

An alternative form of vapor producing mechanism, shown in Figure 5 of the drawing, is shown as connected detachably to the inlet tube 27. This form comprises a casing 37 provided with a detachable top 38. The casing 37 is suitably secured to a base plate 39, which in turn, is mounted by standards 40 on a sub-base 41. The standards 40 are of the same height as standards 7 so as to ensure a proper connection with the inlet tube 27, of a discharge tube 42 extending laterally from the casing 37 at the same height above the base plate 39 as the inlet tube 27 is above the base plate 8.

A container 43 is suitably supported within the casing 37 upon a platform 44 mounted upon standards 45 and 46 extending upwardly from the bottom of the casing 37. The container 43 is surrounded by heating coils 47 to heat and vaporize any liquid or solution which may be located in the container 43. Wires 48 and 49 extend from the heating coils 47 to terminals 50 and 51 for the electric wires 52 and 53 connected to any suitable source of electrical energy.

It will be apparent from the drawing that when the heating and vapor discharge casing 9 is connected up to any desired number of vaporizing devices, the valves controlling the inlet of the various vapors into the casing 9 may be used to selectively determine which of the medicated vapors will be discharged through the nipple 23. It will also be obvious that the various valve connections may be manipulated to discharge the vapors from the distributer in any succession desired, or in any combinations desired.

It is apparent that changes in the details of construction of the various elements of this invention may be made without departing from the spirit of the invention, and I particularly wish it understood that the invention is not to be considered as limited except as indicated in the claims appended hereto.

What I claim is:

1. In vaporizing apparatus, a vapor distributer comprising a casing, a source of heated vapor supply, a valve controlled inlet connected to said casing near the bottom end thereof and connected to said source of vapor supply, an electric light bulb at the lower end of said casing to reheat the vapor, a suction fan in the upper end of said casing, a baffle plate having a central aperture secured in said casing below said fan and above said bulb, and a discharge outlet connected to said casing near the fan.

2. In vaporizing apparatus, a vapor distributer comprising a casing, a plurality of sources of heated vapor supply, a plurality of valve controlled inlets connected to said casing near the bottom end thereof, each of said inlets being connected to one of said sources of vapor supply, an electric light bulb at the lower end of said casing to reheat said vapors, a suction fan in the upper end of said casing, a baffle plate having a central aperture secured in said casing below said fan and above said bulb, and a discharge outlet connected to said casing near the fan.

JOHN J. NOWAK.